Aug. 27, 1946. W. H. HUNTER 2,406,543
FRICTIONAL MECHANISM
Filed Dec. 3, 1943 3 Sheets-Sheet 1
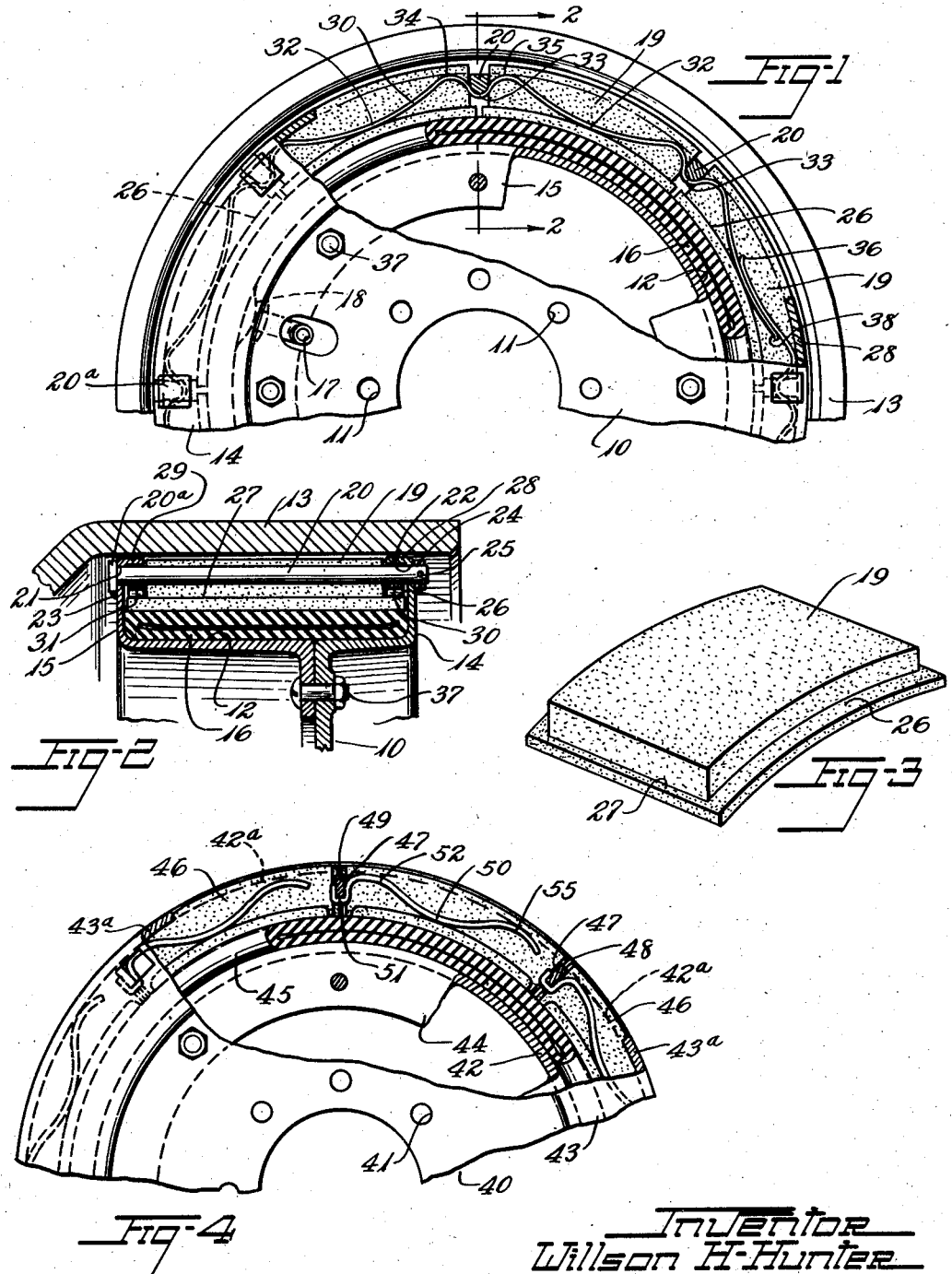

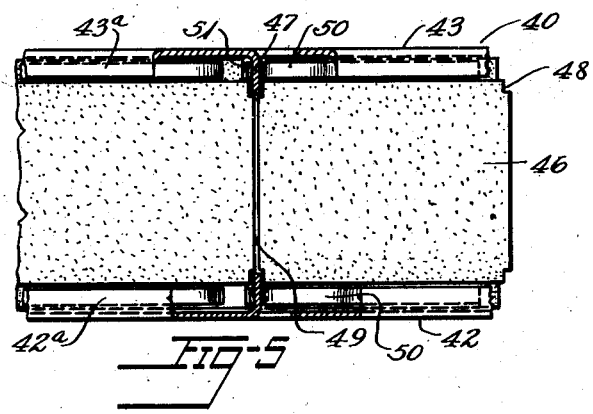
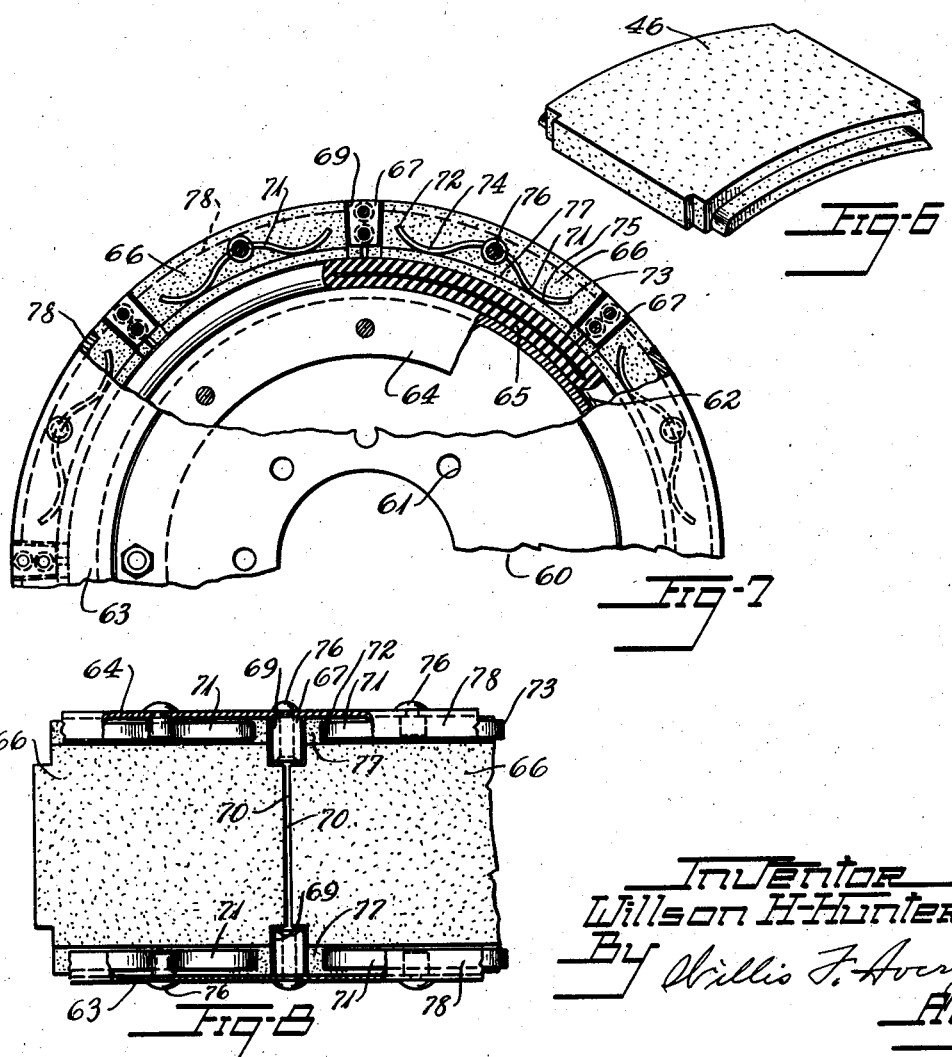

Aug. 27, 1946.  W. H. HUNTER  2,406,543
FRICTIONAL MECHANISM
Filed Dec. 3, 1943  3 Sheets-Sheet 3

Inventor
Willson H. Hunter
By Willis F. Avery
Atty.

Patented Aug. 27, 1946

2,406,543

UNITED STATES PATENT OFFICE 2,406,543

FRICTIONAL MECHANISM

Willson H. Hunter, Lakewood, Ohio, assignor to
The B. F. Goodrich Company, New York, N. Y.,
a corporation of New York Application December 3, 1943, Serial No. 512,721

13 Claims. (Cl. 188—152)

This invention relates to frictional mechanism for rotative bodies such as brakes for the wheels of aircraft or other vehicles although features of the invention are useful in mechanisms such as clutches operated by fluid pressure.

The principal objects of the invention are to provide a high degree of spring action without using objectionally stiff springs, to provide high concentricity of adjacent friction elements with a cooperating frictional member and maintenance of such concentricity as the blocks move in or out of engagement with a cooperating frictional member, to provide for protecting an expander tube from dirt and from direct radiation of heat, and to provide for facility of assembly.

Further objects are to provide for dependable operation, to provide for facility of maintenance, to provide a high degree of equalization in the distribution of frictional pressure, to provide flexible self-conforming action of the friction surface, to provide for substantially concealing the retractor springs within the confines of the friction elements, and to provide longevity of the mechanism.

These and other objects will appear from the following description and the accompanying drawings:

Of the drawings,

Fig. 1 is a side elevation, partly broken away and partly in section, of a frictional mechanism constructed in accordance with and embodying the invention.

Fig. 2 is a sectional view taken along the line 2—2 of Fig. 1.

Fig. 3 is a perspective view of a friction element used in the embodiment of Figs. 1 and 2.

Fig. 4 is a side elevation, partly broken away and partly in section, of a modified construction.

Fig. 5 is a detail face view, partly broken away and partly in section, of the embodiment of Fig. 4.

Fig. 6 is a perspective view of a friction element.

Fig. 7 is a side elevation, partly broken away and partly in section, of a further modified construction.

Fig. 8 is a detail face view, partly broken away and partly in section, of the embodiment of Fig. 7.

Figure 9:
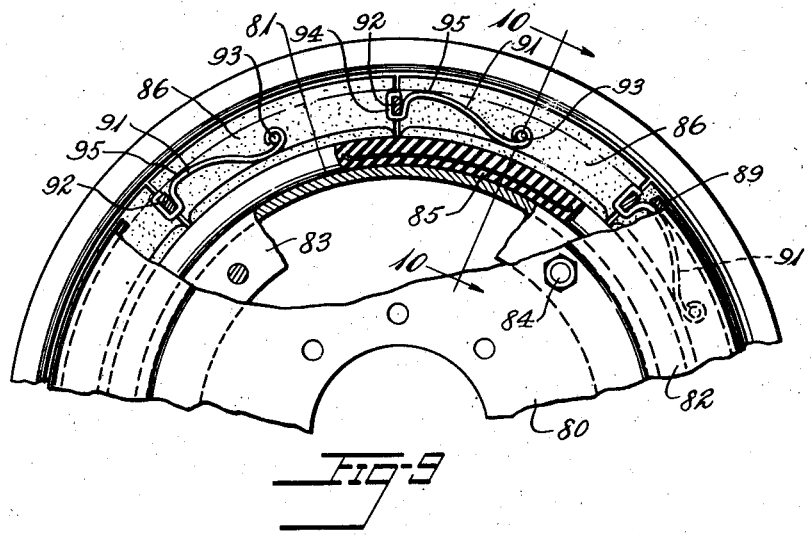
Fig. 9 is a side elevation, partly broken away and partly in section, of still another modified form of the invention.

Referring to the drawings, and first to Figs. 1 to 3 thereof, the numeral 10 designates an annular torque frame that may be fastened through holes 11 as by bolts or other fastening means (not shown) to a flange of a shaft (not shown). The torque frame is formed with a fixed flange 14 at one side and a removable flange 15 at the other, fastened together by bolts 37, which define a circumferential outwardly facing channel 12 within a surrounding brake drum 13. Seated within the annular channel 12 is an annular expander tube 16 adapted to force the braking surface against the drum when the tube is inflated. The expander tube 16 is connected by an L-shaped metal stem 17 extending through the torque frame 10 to a source of fluid pressure (not shown). The annular channel 12 is also formed with a localized depression 18 at the position of the connection 17 so that the tube walls will remain spaced-apart at this position to facilitate initial entry of the fluid and subsequent drainage thereof.

Retained within the channel 12 over the expander tube 16 and in direct contact therewith, are a plurality of brake elements 19, preferably formed of molded, heat resistant composition. These elements are adapted to be forced into frictional engagement with the brake drum 13 when the expander tube is inflated and to clear the drum when the tube is deflated. The elements are relatively thin and somewhat flexible so as to conform to the opposing brake drum in full circle contact, while providing light weight construction.

To retain the elements 19 in place in the channel 12, and to prevent excessive undesirable circumferential displacement thereof a series of narrow torque bars 20, of a length sufficient to bridge the width of the channel, extend between circumferentially adjacent brake elements 19 and through opening 21, 22 in the flanges 15 and 14 respectively.

The torque bars may be secured to one of the flanges as by heads 20a of the bars engaging against the flange 15 and welded thereto as at 23. The other ends of the bars extend through flange 14 and may be secured thereto as by a washer 24 and a cotter pin 25, or other suitable fastening means.

The elements 19 are rabbeted about the margins of their drum-engaging faces to provide adjacent their supporting faces circumferentially extending marginal ledges 26 and terminal ledges 27 (see Fig. 3). The flanges 14, 15 of the torque frame have inwardly directed circumferential flanges or ledges 28, 29 respectively extending over the circumferential ledges 26 of the elements in overlapping relation for retaining them in the channel 12. The flanges 28, 29 define circumferential channels or passages with the elements 19 for confining leaf springs 30, 31.

The terminal ledges 27 of the elements 19 extend beneath the torque bars 20 and provide clearance space therefor while the ledges of successive elements approach each other under the bars and with the bars shield the expander tube from heat radiated from the drum 13.

The retractor springs 30, 31 are preferably of flat spring wire and extend completely around the torque frame. Each spring is corrugated to provide inwardly bowed portions 32 adapted to press against the ledges 26 of the elements to force the elements radially inward of the torque frame, and inwardly bowed portions 33 for engaging about the torque bars 20, with outwardly bowed portions 34, 35 at each side of the cross bars to restrain the spring against circumferential displacement and to bear against the ledges 28, 29. The ends 36, 38 of the spring may be overlapped. The arrangement is such that inflation of the expander tube 16 causes the springs to be flattened at their bowed portions 32 by pressure of the ledges 26 outwardly with the bowed portions 33 first fulcruming about the torque bars 20 and then about the ledges 28, 29.

Referring to the embodiment shown in Figs. 4 and 5, the numeral 40 designates a torque frame that may be fastened through holes 41 to a flange of a shaft (not shown). The torque frame is formed with a circumferential channel 42 defined by a fixed flange 43 at one side and a removable flange 44 at the other secured to each other by bolts. Seated within the annular channel 42 with its inner face in continuous contact therewith is an annular expander tube 45 adapted to force the braking surface against a cooperating frictional member (not shown).

Seated in the channel 42 over the expander tube 45 and in direct contact therewith in closely spaced relation, are a plurality of brake elements 46 preferably formed of molded heat resistant composition. These elements are adapted to be forced into frictional engagement with a brake drum (not shown) when the tube is inflated and released from the same when the tube is deflated. The elements may be of thin construction to promote a high degree of concentricity for full circle contact.

The elements 46 are retained in place in the channel 42 against undesirable circumferential movement by a series of torque-resisting lugs 47 disposed between the adjacent terminal faces of the elements 46. These lugs 47 may be formed by inwardly bending a section of the flanges 42 and 43 for a short distance at positions between the adjacent elements 46. The elements may have their corners notched as at 48 to receive the lugs 47 so that the space 49 between adjacent elements 46 is relatively small to shield the tube 45 from radiated heat, or where the lugs extend only the width of the ledges, hereinafter described, notching of the elements may be dispensed with.

For retaining the elements radially within the desired range of movement, the flanges 42, 43 are provided with inwardly turned circumferential margins or ledges 42a, 43a, and the circumferential margins of the elements 46 are rabbeted at their drum-engaging faces to provide laterally extending ledges underlying the ledges 42a, 43a of the flanges, as shown in Fig. 6. This provides annular passages at the sides of the elements to clear the torque-resisting lugs and the springs.

Leaf springs 50, for retracting the elements are housed in the passages provided between the torque frame flanges and the elements. Each spring 50 has an end portion 51 of U-shape adapted to engage about a torque lug 47 and has outwardly bowed portions 52, 55 near its ends for engaging under the marginal ledges 42a, 43a while its central portion is inwardly bowed to engage the ledge of the element. The arrangement is such that each spring is tensioned between the adjacent element and the inwardly turned overlapping margin of the torque flange thereover and acts to force the element radially inward when the expander tube is deflated.

Referring to the embodiment of the invention illustrated in Figs. 7 and 8, a torque frame 60 that may be fastened through holes 61 to a flange of a shaft (not shown) is formed with a circumferential channel 62 defined by a fixed flange 63 at one side and a removable flange 64 at the other. Seated within the annular channel 62, with its inner face in continuous contact therewith is an annular expander tube 65 adapted to force the braking surface against a cooperating frictional drum (not shown).

Retained in the channel 62 over the expander tube 65 and in direct contact therewith are a plurality of brake elements 66, preferably formed of molded, heat-resistant composition. The elements 66 may be slightly flexible and are adapted to be forced into frictional engagement with a brake drum (not shown) when the tube 65 is inflated and to be released from contact with the same when the tube is deflated.

The friction elements 66 are retained circumferentially in the channel 62 by a series of torque-resisting lugs 67 on the flanges of the frame 60. The corners of the elements 66 may be notched as at 69 to clear the lugs 67, when the lugs extend beyond the braking surface as shown in the drawings, so that the elements cannot move excessively circumferentially of the channel 62. The notches 69 of the blocks 67 also permit the adjacent faces 70 of the elements 66 to lie in close juxtaposition so that directed radiated heat from the drum cannot readily reach the expander tube 65. Shorter lugs may be employed, however, and the notches dispensed with, if desired.

A reversely-bowed leaf retractor spring 71 having its inwardly arched end portions 72, 73 and an outwardly arched center portion, is fastened at its central portion, as by rivets 76 to the flanges 63 and 64 of the frame 60. The curved arms 74 and 75 of the spring 71 are adapted to ride on a circumferential ledge 77 of the element 66 so as to urge the element 66 radially inward to a smaller diameter when the pressure is released from the expander tube 65.

The torque flanges 63 and 64 may have inwardly turned marginal ledges 78 to cover the spring 71, to facilitate alignment of the blocks 66 in the channel 62, and limit the radial travel of the blocks in the channel 62 by engaging over the ledges 77 in overlapping relation.

Figure 10:
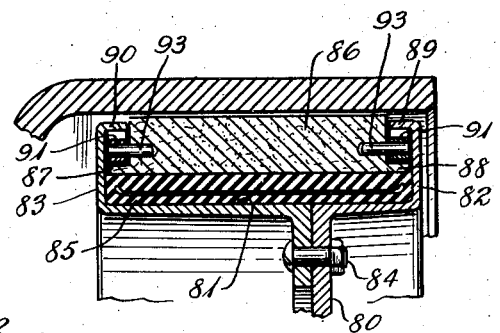
Fig. 10 is a cross-section thereof, taken on line 10—10 of Fig. 9.
Figure 11:
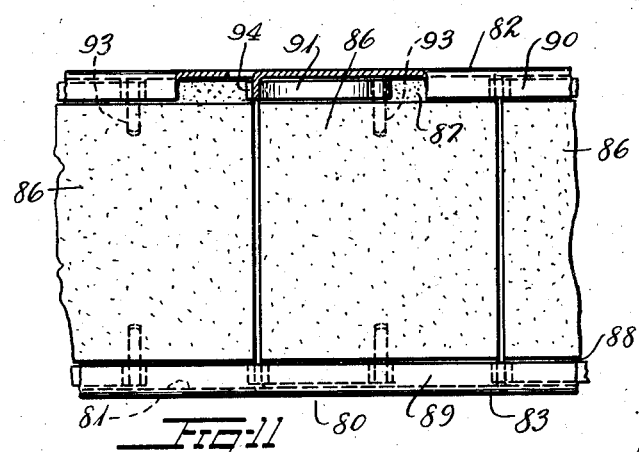
Fig. 11 is a detail view of the braking face of the structure shown in Fig. 9, parts being broken away and parts shown in section.

Referring to Figs. 9 to 11 of the drawings, the numeral 80 designates a torque frame having a circumferential outwardly facing channel 81 defined by radially extending flanges 82, 83. The flange 82 is fixed with respect to the torque frame, whereas the flange 83 is removable and secured by bolts 84. Seated within the channel 81 is an expander tube 85 of resilient rubber or other rubber-like material. Within the channel over the expander tube and in direct contact therewith are a series of arcuate brake elements 86 of heat resistant friction material which may be somewhat flexible. The elements 86 are seated on the expander tube and are closely spaced to provide substantially full circle contact with a surrounding brake drum (not shown), and to protect the expander tube from direct radiation of heat.

For retaining the elements in the channel for limited radial movement the circumferential margins of the elements are rabbeted from the braking face thereof to provide marginal retaining ledges 87, 88, and the flanges 82, 83 have their outer circumferential margins turned inwardly to form circumferential shoulders 89, 90 respectively, extending over the ledges. The radial spacing of the ledges 87, 88 from the shoulders 89, 90 is such as to define circumferential spaces therebetween at all times. Located within such circumferential spaces are a series of leaf springs 91 preferably of flat spring wire. The material of the flanges 82, 83 is pierced with U-shaped cuts at regular intervals and the enclosed portions are turned into the channel to provide torque lugs 92. The elements 86 have laterally extending pins 93 in their rabbeted portions projecting into the circumferential spaces between the successive torque lugs. Each leaf spring 91 has one end 94 looped about one of the torque lugs and the opposite end thereof looped about a pin 93. Between its looped ends, the spring is bowed outwardly as at 95 so that it bears outwardly on the shoulder thereover as a fulcrum. It also bears against the ledge 87 or 88, near the pin 93 and is stressed between the ledge and the shoulder so as to press the element toward the expander tube. The arrangement is such that the blocks 86 are pressed against the expander tube 85 by the springs 91 which also act to resiliently hold the elements 86 circumferentially against all but limited movement afforded by straightening of the springs under torque, while fluid under pressure admitted to the expander tube 85 will force the elements radially outward against the brake drum.

This arrangement has the advantage of cushioning circumferential shock when braking forces are applied while the same cushioning means acts to retract the friction elements quickly when the braking force is released.

In all the embodiments of the invention, the friction elements may be readily molded or machined from friction brake material and are relatively simple to produce. The seating of the friction elements directly upon the expander tube and their thin, somewhat flexible construction assures their conforming to the braking surface and maintaining their concentricity throughout their movement, while the location of the springs at the sides of the brake elements provides space for springs of high amplitude of springing movement without excessive stiffness. The arrangement of the friction elements, the retractor springs and the torque pins or lugs is such as to facilitate assembly and to protect the tube from direct radiation of heat while the spring arrangement prevents hanging or dragging of the brakes and affords a quick release of braking contact. The springs are so concealed as to protect them from dirt, and the arrangement of springs and friction elements protects the expander tube from contact with oil, grease, or other foreign matter which might damage the tube. Also, the ledges at the sides of each friction element provide a larger surface of the element at the expander face thereof than at the drum-engaging face of the element, which provides a mechanical advantage in the force applied to the drum.

Variations may be made without departing from the scope of the invention as it is defined by the following claims.

I claim:

1. Frictional mechanism for controlling relative rotation of rotatable parts, said mechanism comprising a pair of concentric members, one of said members having an annular channel open toward the other, an inflatable expander located in said channel, friction elements on said expander within the channel, said channel and said elements having circumferentially extending marginal ledges in overlapping relation defining passages at the sides of said elements, and spring means located at the sides of said elements within said passages for retracting said elements.

2. Frictional mechanism for controlling relative rotation of rotatable parts, said mechanism comprising a pair of concentric members, one of said members having an annular channel open toward the other, an inflatable expander located in said channel, friction elements on said expander within the channel for engagement with the opposing member, torque-resisting means extending into said channel from the side walls thereof, said side walls and said elements having circumferentially extending marginal ledges in overlapping relation defining passages at the sides of said elements, and spring means anchored to said torque-resisting means within said passages for retracting said elements.

3. Frictional mechanism for controlling relative rotation of rotatable parts, said mechanism comprising a pair of concentric members, one of said members having an annular channel open toward the other, an inflatable expander located in said channel, friction elements directly seated on said expander within the channel, said side walls of the channel and said elements having circumferentially extending marginal ledges in overlapping relation defining passages at the sides of said elements, and spring means located at the sides of said elements within said passages for retracting said elements, said spring means comprising bowed leaf springs anchored to the channel and impinging against a ledge of a friction element.

4. Frictional mechanism for controlling relative rotation of rotatable parts, said mechanism comprising a pair of concentric members, one of said members having an annular channel open toward the other, an inflatable expander located in said channel, a series of friction elements directly seated on said expander within the channel in close formation providing a substantially continuous friction surface for engagement with the opposing member, torque-resisting means extending into said channel from the side walls thereof, said side walls and said elements having circumferentially extending marginal ledges in overlapping relation for limiting radial movement of said elements and defining passages at the sides of said elements, and spring means located at the sides of said elements within said passages and associated with said torque-resisting means for retracting said elements, said spring means comprising a bowed leaf spring resiliently stressed between the overlapping ledges of a channel side wall and a friction element.

5. Frictional mechanism for controlling relative rotation of rotatable parts, said mechanism comprising a pair of concentric members, one of said members having an annular channel open toward the other, an inflatable expander located in said channel, a series of friction elements directly seated on said expander within the channel in close formation providing a substantially continuous friction surface for engagement with the opposing member, torque-resisting means extending into said channel from the side walls thereof, said side walls and said elements having circumferentially extending marginal ledges in overlapping relation for limiting radial movement of said elements and defining passages at the sides of said elements, and spring means located at the sides of said elements within said passages and associated with said torque-resisting means for retracting said elements, said spring means comprising a bowed leaf spring anchored to torque-resisting means and bearing against a ledge of a friction element.

6. Frictional mechanism for controlling relative rotation of rotatable parts, said mechanism comprising a pair of concentric members, one of said members having an annular channel open toward the other, an inflatable expander located in said channel, a series of friction elements directly seated on said expander within the channel in close formation providing a substantially continuous friction surface for engagement with the opposing member, torque-resisting means extending into said channel from the side walls thereof, said side walls and said elements having circumferentially extending marginal ledges in overlapping relation for limiting radial movement of said elements and defining passages at the sides of said blocks, and spring means located at the sides of said elements within said passages and associated with said torque-resisting means for retracting said elements, said spring means comprising a bowed leaf spring anchored to one of said torque-resisting means and bearing against the overlapping ledges of a channel side wall and a friction element.

7. Frictional mechanism for controlling relative rotation of rotatable parts, said mechanism comprising a pair of concentric members, one of said members having an annular channel open toward the other, an inflatable expander located in said channel, a series of friction elements directly seated on said expander within the channel in close formation providing a substantially continuous friction surface for engagement with the opposing member, torque-resisting means extending into said channel from the side walls thereof, said side walls and said elements having circumferentially extending marginal ledges in overlapping relation for limiting radial movement of said elements and defining circumferential passages at the sides of said elements, and spring means located at the sides of said elements within said passages and associated with said torque-resisting means for retracting said elements, said spring means comprising a leaf spring extending completely about said channel, said spring having portions engaging about said torque-resisting means, and bowed portions therebetween bearing against a ledge of the channel side wall and overlapping ledges of said friction elements.

8. Frictional mechanism for controlling relative rotation of rotatable parts, said mechanism comprising a pair of concentric members, one of said members having an annular channel open toward the other, an inflatable expander tube located in said channel, a series of friction elements directly seated on said expander tube within the channel in close formation providing a substantially continuous friction surface for engagement with the opposing member, torque-resisting means extending into said channel from the side walls thereof, said side walls and said elements having circumferentially extending marginal ledges in overlapping relation for limiting radial movement of said elements and defining circumferential passages at the sides of said elements, and spring means located at the sides of said elements within said passages and associated with said torque-resisting means for retracting said elements, said spring means comprising a bowed spring having one end engaging one of said torque-resisting means and the other end anchored to a friction element for resiliently cushioning circumferential shock of engagement.

9. Frictional mechanism for controlling relative rotation of rotatable parts, said mechanism comprising a pair of members, one of said members having a channel open toward the other, an expander in said channel, friction elements associated with said expander in said channel, a torque bar secured to said channel and extending across said channel between said elements, said friction elements having circumferential axially projecting marginal ledges, each ledge projecting at the side of the element beyond the friction face of the element, and retractor spring means located within said channel at the marginal ledges and operable on said marginal ledges of said elements.

10. Frictional mechanism as defined in claim 9 in which said torque bar is insertable through a side of said channel.

11. Frictional mechanism as defined in claim 9 in which said retractor spring means engages said torque bar and said ledges of said friction elements.

12. Frictional mechanism as defined in claim 9 in which said retractor spring means comprises a spring engaging said torque bar and said ledges of a pair of circumferentially adjacent friction elements.

13. A frictional mechanism comprising a pair of concentrically arranged relatively rotatable members, one of said members having flanges defining a channel open toward the other member, an expander seated in said channel, a series of pressure elements upon said expander and movable radially of the channelled member, said pressure elements having circumferential margins extending axially beyond the working faces of the pressure elements, spring means on said margins and engaging adjacent elements for resiliently urging them toward each other, and means for limiting circumferential movement of said elements.

WILLSON H. HUNTER.